United States Patent [19]

Davis

[11] 3,831,928
[45] Aug. 27, 1974

[54] SINGLE SHEET DOCUMENT FEEDER
[75] Inventor: James W. Davis, Warrensville Heights, Ohio
[73] Assignee: Addressograph Multigraph Corporation, Cleveland, Ohio
[22] Filed: Mar. 28, 1973
[21] Appl. No.: 345,510

[52] U.S. Cl. .................................. 271/35, 271/167
[51] Int. Cl. ............................................. B65h 3/54
[58] Field of Search ............ 271/35, 121, 122, 123, 271/124, 125, 104, 137, 138, 167

[56] References Cited
UNITED STATES PATENTS
| 585,076 | 6/1897 | Barry .............................. 271/138 X |
| 2,907,567 | 10/1959 | Schneider et al. .................... 271/35 |
| 3,052,465 | 9/1962 | David ............................... 271/122 |

Primary Examiner—James B. Marbert
Assistant Examiner—Bruce H. Stoner, Jr.
Attorney, Agent, or Firm—Ray S. Pyle

[57] ABSTRACT

An apparatus for feeding articles from the bottom of a stack of such articles. The relative coefficients of friction of the articles, an endless belt drive and an article limiter are used to restrict movement to one article at a time. The article limiter begins to pivot when the endless belt drive moves. The pivoting produces an additional force perpendicular to the stack of articles to assist in transporting documents toward the article limiter. Separation of the articles in the stack also occurs to varying degrees as a result of the article limiter pivoting.

3 Claims, 7 Drawing Figures

SINGLE SHEET DOCUMENT FEEDER

BACKGROUND OF THE INVENTION

The present invention relates generally to an apparatus for feeding articles from a stack and, more specifically, to the bottom feeding of documents one at a time from a stack of documents.

Feeding articles from the bottom of a stack is often a desirable yet difficult task. The total weight of all of the articles in the stack causes problems with separation of the articles for seriatim feeding.

Intermittently driven rollers or belts beneath the stack of articles have been used in the past to feed articles from the bottom of a stack. But the problem of separating the articles still remains. Prior art concepts generally use some sort of restraining member mounted ahead of the stack of articles to restrict all but one article from moving. The restraining member may be a stationary device or possibly one capable of movement in some respect. If these restraining members are permanently mounted, or even adjustably mounted, the size of the article to be fed is limited. Often, when the restraining member is moveable, for instance pivotable, additional means are required to assure passage of only one article at a time.

One prior art concept, U.S. Pat. No. 2,907,567, in fact, uses a restraining device similar to that of the presently disclosed invention. In this reference the separation by this device is stated to be capable of restricting only "several lower-most articles" and therefore requiring additional separation.

SUMMARY OF THE INVENTION

The present invention concerns an apparatus for feeding sheet articles, specifically envelopes, card stock, paper, etc., from the bottom of a stack of such sheet articles in a manner limiting the quantity of articles fed from the apparatus to singular articles in succession. The apparatus has the ability to be operated in conjunction with another article handling machine supplying a demand signal to the present apparatus whenever an article is required by the handling machine.

It is therefore the primary object of this invention to feed articles from the bottom of a stack of such articles one at a time in a highly reliable manner.

Another object of this invention is to feed articles while requiring a minimum of operator involvement in regard to article separation upon loading a stack of articles.

A further object of the invention is to allow feeding of articles of intermixed weight and thickness to a greater degree than before possible.

DESCRIPTION OF THE PREFERRED EMBODIMENT

Figure 1:
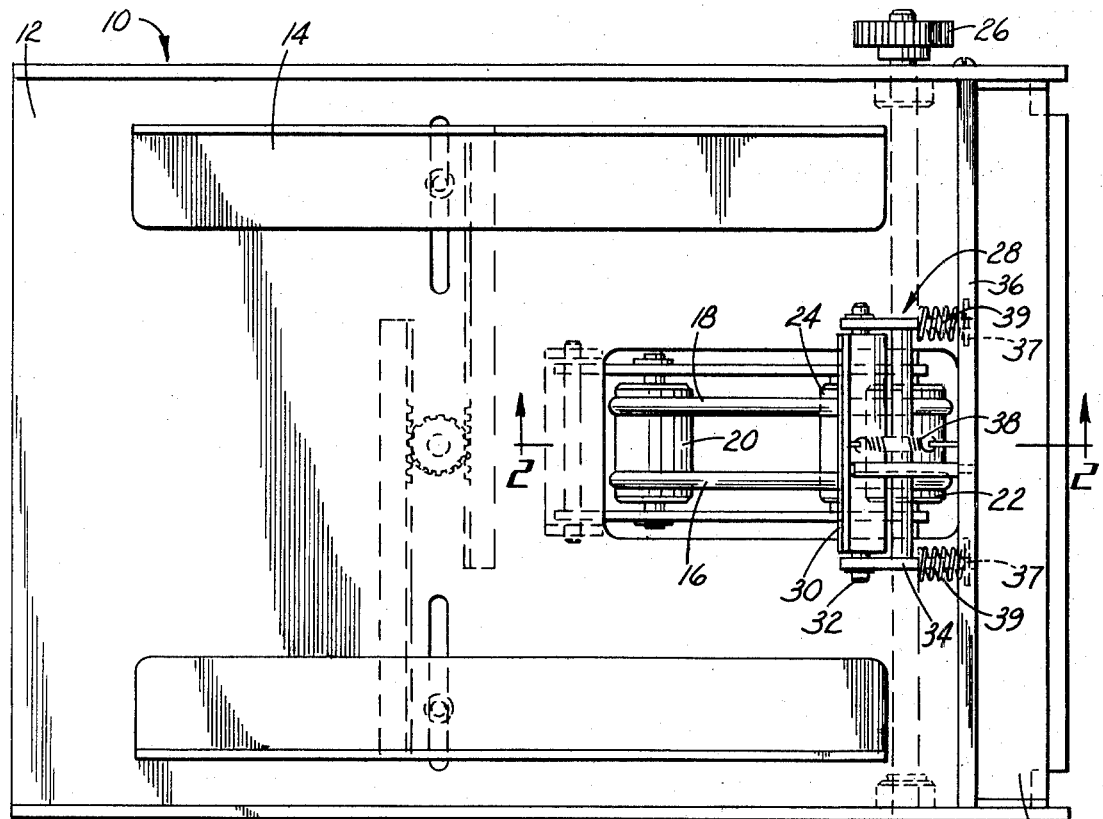
FIG. 1 is a plan view from the top of the article feeding apparatus.

An article feeding apparatus is shown generally as 10 in FIG. 1. A tray 12 serves to support a stack of articles to be fed by the apparatus 10. Guide means 14 are included to position the articles. Two thin endless belts 16 and 18 are supported by rotatably mounted pulleys 20 and 22. An additional pulley 24 is positioned between the belt pulleys 20 and 22 to help support the belt surface adjacent to the articles to be fed. Belt pulley 22 is connected to a controllable drive motor not shown through the drive gear 26 for driving the endless belts 16 and 18 whenever an article is desired to be fed.

Figure 2:
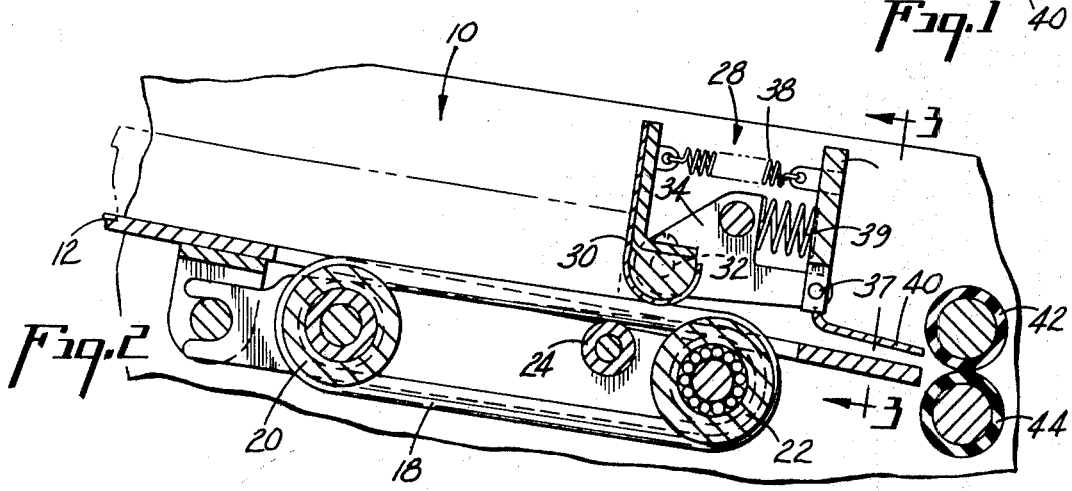
FIG. 2 is a cross-sectional view of the article feeder taken substantially along line 2—2 of FIG. 1.
Figure 3:
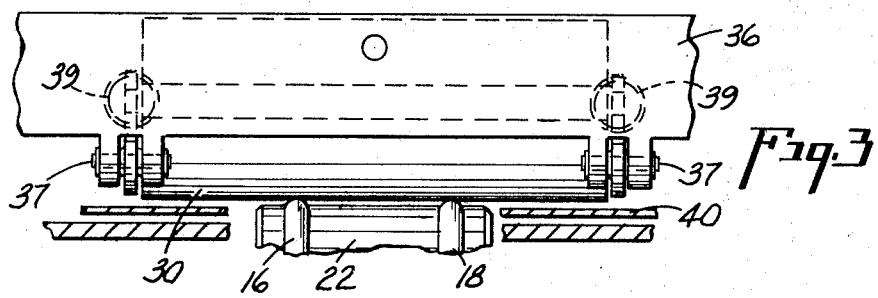
FIG. 3 is a cross-sectional view of the article feeder taken substantially along line 3—3 of FIG. 2.

An article limiter, shown generally as 28 in FIGS. 1 and 2, is positioned over the endless belts 16 and 18. The article limiter 28 includes a pivotable shoe 30 (FIG. 2) which is mounted for rotation about a shaft 32. Either end of the shaft 32 is mounted in a support bracket 34 which is in turn mounted to a frame member 36 through the pivot 37, FIG. 3. The upper end of the pivotable shoe 30 and the frame member 36 are connected by a tension spring 38 which urges the pivotable shoe to remain normal to the endless belts 16 and 18. Positioned between the support bracket 34 and the frame member 36 are two compression springs 39, which serve to hold the article limiter 28 against the endless belts.

Positioned downstream from the endless belts 16 and 18 is a guide plate 40 which directs the articles which have passed the article limiter 28 to a set of take-up rollers 42 and 44. The take-up rollers 42 and 44 are continually driven by means (not shown) to effect removal of the articles from the area of the apparatus 10.

FIGS. 4 through 7 illustrate the article feeding apparatus in operation. Although the apparatus is shown feeding paper documents 50a, 50b and 50c, this embodiment is not intended to limit the scope of the invention.

Before discussing the details of operation of the article feeding apparatus, the coefficients of friction of the elements of the apparatus, relative to one another, should be disclosed. The relative values of the coefficients of friction are important for an efficient operation of the apparatus.

The tray 12 has a low coefficient of friction relative to the documents, while the endless belts 16 and 18 have a high coefficient of friction relative to the documents. Finally, the surface of pivotable shoe 30 has a coefficient of friction, with respect to a document, which is of a medium magnitude, i.e., larger than tray 12 but smaller than endless belts 16 and 18. Additionally, the relative coefficient of a document to the pivotable shoe must be larger than that of document to document.

Figure 4:
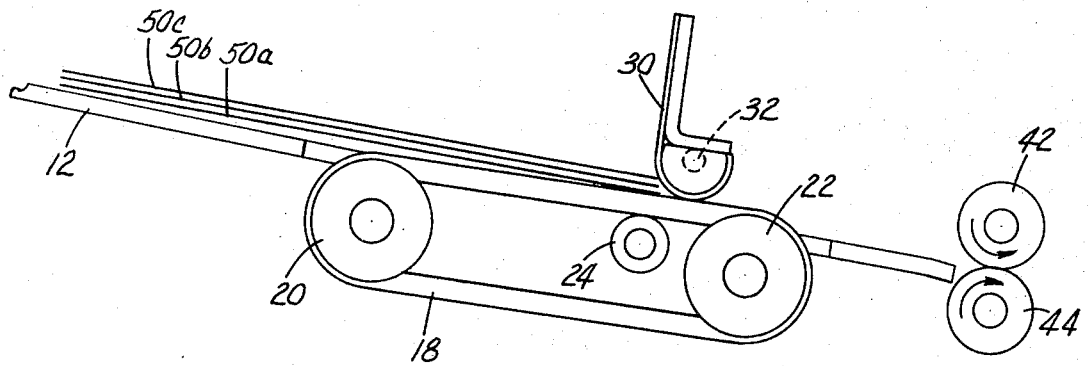
FIG. 4 is a schematical illustration of the article feeder similar to FIG. 2 prior to the initiation of a feed cycle.

The initiation of a document feed has not yet occurred in the illustration of FIG. 4. The documents 50a, 50b and 50c are resting on the tray 12 and partially on the endless belt 18. The pulleys 20 and 22 are not turning; therefore the documents remain stationary and the pivotable shoe 30 is perpendicular to the documents.

Figure 5:
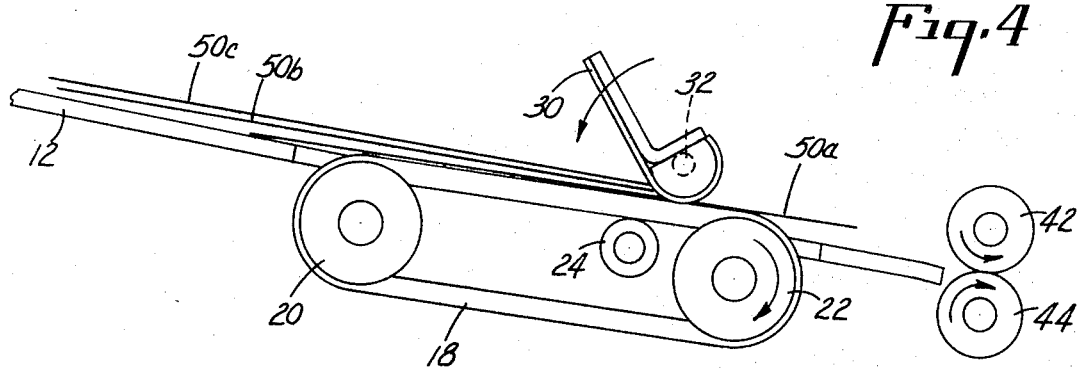
FIG. 5 is a schematical illustration of the article feeder similar to FIG. 2 just after the initiation of a feed cycle.

FIG. 5 is an illustration of the apparatus immediately after the controllable drive motor (not shown) has received a signal and begun to turn the drive gear 26 thus activating the pulley 22. The stack of documents, in this case 50a, 50b and 50c, may or may not be moved by the endless belts 16 and 18 as the pulley 22 initially turns. The movement of the stack, initially is dependent upon the weight of the stack. Since the article limiter 28 pivots about pin 37 and is held in contact with the endless belts 16 and 18 through the pressure exerted by compression springs 39, the pivotable shoe 30 will begin to pivot counterclockwise, as shown by the arrow in FIG. 5, when the endless belts 16 and 18 begin to move. As the pivotable shoe 30 continues to pivot, the upper end of the shoe contacts the stack of documents and causes a force to be exerted through the stack normal to the endless belts 16 and 18. This normal force assures that the stack of documents moves with the endless belts. The documents are held together by the frictional contact between them.

As the endless belts 16 and 18 continue to move, the documents are drawn against the pivotable shoe. Once the pivotable shoe 30 is contacted by the moving documents, the frictional contact between the shoe surface and the document is sufficient to overcome the inter-document frictional forces.

Since the frictional force between the endless belts 16 and 18 and the nearest document 50a (FIG. 5) is greater than the inter-document frictional force and the pivotable shoe 30 frictional force relative to the documents, these other forces do not overcome the effect of endless belts. Therefore, the bottom-most document 50a is moved beyond the pivotable shoe 30 as shown in FIG. 5. After the bottom-most document 50a has moved between the pivotable shoe and the endless belts 16 and 18, the movement of the document with the belts causes continuing pivoting of the shoe 30.

Figure 6:
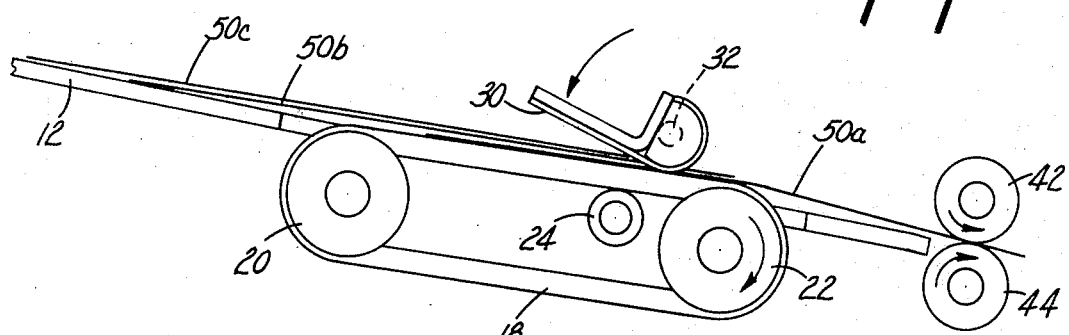
FIG. 6 is a schematical illustration of the article feeder similar to FIG. 2 as the feed cycle is almost complete.

FIG. 6 illustrates the article feeding apparatus 10 at a stage in which the feeding of a document 50a is nearly complete. The endless belts 16 and 18 have caused the document 50a to pivot the shoe 30 to a fully pivoted position. This fully pivoted position is variably dependent upon the total height of the stack of documents. As the height of the stack increases, the degree to which the pivotable shoe 30 pivots in a counterclockwise direction decreases due to the force necessary to overcome the tension spring 38 and the mass of the stack of documents. In fact, the results of experimentally increasing the document stack height indicate that after a specific stack height has been reached, any further increase in height may cause unreliable feeding, depending upon the particular article being fed.

The lead edge of the bottom-most document 50a in FIG. 6 has moved past the pivotable shoe 30 to an extent allowing exposure to the take-up rollers 42 and 44. The remaining documents are affected by the frictional forces in varying degrees and thus result in separation of the documents. Again, due to the dependence of pivoting of the shoe 30 upon stack height the separation of documents will also depend upon the stack height. This separation is evident in FIG. 6 where the second document 50b from the endless belts is moved partially under the pivotable shoe 30. The remaining documents, 50c in this case, are staggered in relation to the pivotable shoe.

The take-up rollers 42 and 44 carry document 50a away from the article feeding apparatus 10 once the lead edge of the document has reached these rollers. The timing of the controllable drive motor is important so that the endless belts 16 and 18 will no longer be moving once the bottom-most document 50a has been completely removed from the endless belts 16 and 18 by the take-up rollers.

Figure 7:
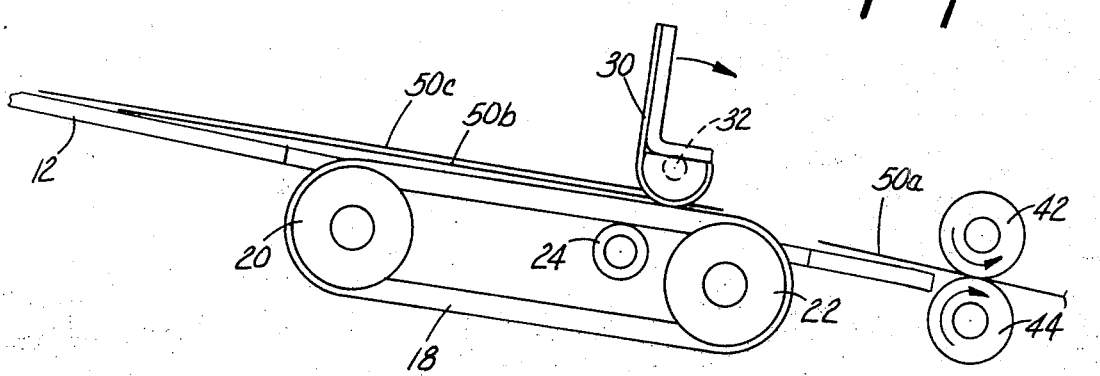
FIG. 7 is a schematical illustration of the article feeder similar to FIG. 2 after a feed cycle has been completed.

FIG. 7 illustrates the apparatus 10 just after a feed cycle has ended. The take-up rollers 42 and 44 have completely removed the bottom-most document 50a from beneath the pivotable shoe 30. The endless belts 16 and 18 are not moving. The pivotable shoe 30 has returned to its normal position, perpendicular to the surface of the documents. As shown in the figure, the new bottom-most document 50b is partially between the pivotable shoe 30 and the endless belts 16 and 18. Although the new bottom-most document, i.e., 50b, is drawn back by the pivotable shoe 30 returning to its normal position, a portion of the next document will usually remain under the shoe 30 after the first document has been fed. The remaining documents, i.e., in this case 50c, are stacked on the tray 12 abutting the pivotable shoe 30.

Each time the controllable drive motor receives a signal indicating a document feed requirement, the procedure detailed above repeats resulting in another document being released. Thus, the article feeding apparatus 10 delivers a single article, i.e., document in this case, on demand.

What is claimed is:

1. An apparatus for feeding sheet articles from the bottom of a stack;

an endless belt and support structure to drive a top run of the belt in a fixed longitudinal path;

guide means for supporting a stack of sheet articles on a plane substantially in register with said path;

an improved sheet feed limiting device positioned above said belt for impeding the advancement of articles from the stack to an extent allowing only singular articles to pass between said limiting device and the belt comprising:

the limiting device including a pivotable shoe having a cross-section configuration defined at least in part by a circular section portion;

a pivot support mounting the shoe for rocking movement about the axis of said circular section portion;

said limiting device including a mount for the pivot support for said shoe, said mount supported pivotally at a position downstream with respect to article feed direction;

means for urging said mount to press said shoe toward said belt and into contact with said belt in the absence of sheet articles, said belt when operating, or moving sheet articles, thereby driving said shoe to a rotated condition; and resilient means urging said shoe in a direction opposite the drive imparted thereto by said belt or sheets when moving.

2. An apparatus as set forth in claim 1, further characterized by an arm projecting from said shoe on the upstream side thereof, the arm projecting in a direction substantially normal to the belt path when the limiting device is inactive, whereby rotation of the shoe will increase as the stack of articles diminishes to press said arm upon the leading edge of the stack and thereby exert an increasing pressure upon the stack in compensation for the decrease in weight of the stack.

3. An apparatus as set forth in claim 1 further characterized in that said article limiter includes a surface adjacent to said articles having a coefficient of friction which is low with respect to said endless belts but high with respect to said articles.

* * * * *